United States Patent
Ahmed et al.

(10) Patent No.: US 10,790,692 B2
(45) Date of Patent: Sep. 29, 2020

(54) MOBILE ELECTRIC VEHICLE WIRELESS CHARGING

(71) Applicant: Ford Global Technologies, LLC, Dearborn, MI (US)

(72) Inventors: Hanan J. Ahmed, Belleville, MI (US); Scott Turik, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 15/727,923

(22) Filed: Oct. 9, 2017

(65) Prior Publication Data

US 2019/0105994 A1    Apr. 11, 2019

(51) Int. Cl.

| | | |
|---|---|---|
| *B60L 53/12* | (2019.01) | |
| *H02J 7/02* | (2016.01) | |
| *B60L 53/60* | (2019.01) | |
| *B60L 53/65* | (2019.01) | |
| *B60M 7/00* | (2006.01) | |
| *B60M 3/00* | (2006.01) | |

(52) U.S. Cl.
CPC .............. *H02J 7/025* (2013.01); *B60L 53/12* (2019.02); *B60L 53/60* (2019.02); *B60L 53/65* (2019.02); *B60M 3/00* (2013.01); *B60M 7/003* (2013.01)

(58) Field of Classification Search
CPC ...... H02J 7/00; H02J 7/02; H02J 7/025; H02J 7/04; H02J 7/16; H02J 7/34; B60L 9/00; B60L 9/14; B60L 53/00; B60L 53/10; B60L 53/12
See application file for complete search history.

(56) References Cited

U.S. PATENT DOCUMENTS

| | | | |
|---|---|---|---|
| 9,090,170 B2 | 7/2015 | Mashinsky et al. | |
| 2012/0161530 A1* | 6/2012 | Urano | H02J 7/025 |
| | | | 307/104 |
| 2017/0028854 A1 | 2/2017 | Lee et al. | |
| 2017/0120758 A1 | 5/2017 | Xu et al. | |

FOREIGN PATENT DOCUMENTS

| | | | | |
|---|---|---|---|---|
| CN | 202285140 U | 6/2012 | | |
| CN | 102324177 B | 6/2013 | | |
| CN | 104967155 A | 10/2015 | | |
| CN | 107093920 | * 8/2017 | .............. | B60L 11/18 |
| CN | 107093920 A | 8/2017 | | |
| EP | 2959568 A1 | 12/2015 | | |
| WO | 201637045 A1 | 3/2016 | | |
| WO | 2016109112 A1 | 7/2016 | | |

OTHER PUBLICATIONS

Combined Search and Examination Report dated Apr. 2, 2019 and Notice of Publication dated May 7, 2019 regarding Application No. GB1816408.7 from the United Kingdom Intellectual Property Office (UKIPO) (8 pages).

* cited by examiner

*Primary Examiner* — Robert J McCarry, Jr.
(74) *Attorney, Agent, or Firm* — Brandon Hicks; Bejin Bieneman PLC

(57) ABSTRACT

A wireless vehicle charging system includes a first cluster of charging pads wired to one another and configured to convert electrical energy to an electromagnetic field. The system further includes a first base station in communication with the first cluster of charging pads. The first base station is programmed to receive information from an electric vehicle and transmit the information to a second base station in communication with a second cluster of charging pads in a path of the electric vehicle.

17 Claims, 4 Drawing Sheets

MOBILE ELECTRIC VEHICLE WIRELESS CHARGING

BACKGROUND

Some electric vehicles can be charged by plugging the vehicle battery into a charging station. Alternatively, some electric vehicles can be charged inductively. Inductive charging involves using a charge coil (sometimes called a "primary coil") to create an electromagnetic field from an electric current. A recipient coil (sometimes called a "secondary coil") on the equipped electric vehicle receives the electromagnetic field and converts the electromagnetic field to electrical current that charges the vehicle battery. Inductive charging is sometimes referred to as "wireless charging." Wireless charging may be done in stationary mode or while the vehicle is moving.

DETAILED DESCRIPTION

Figure 1A:
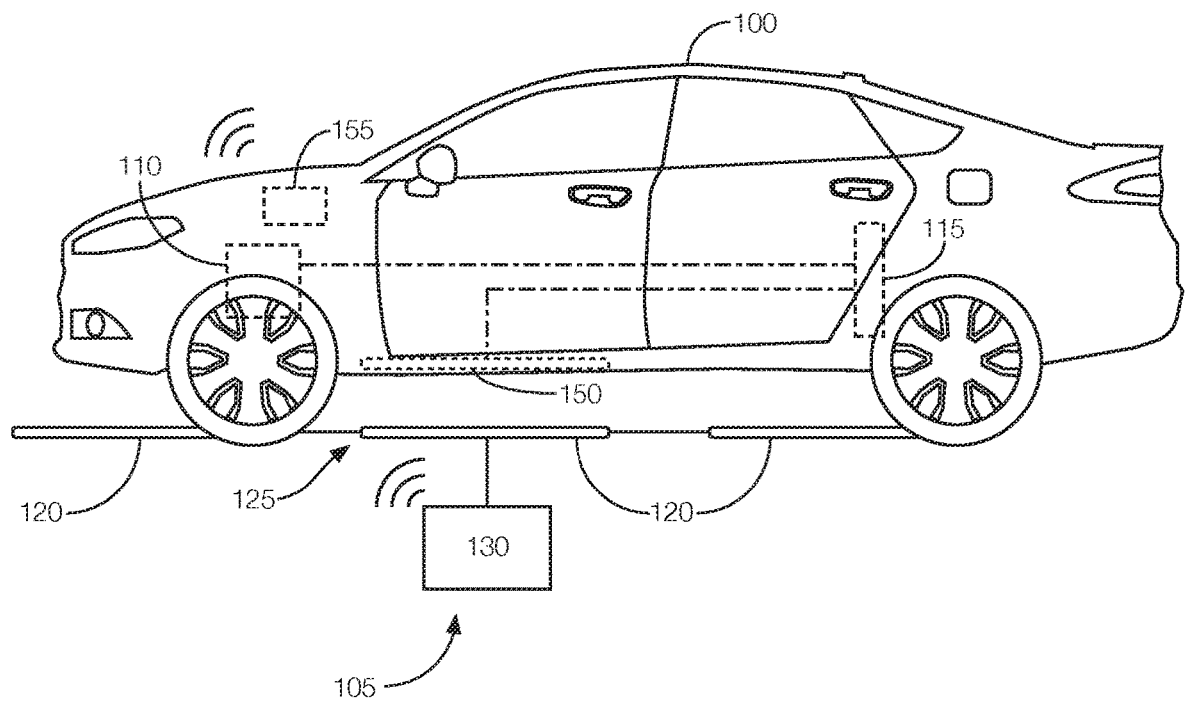
FIGS. 1A and 1B illustrate components of an example electric vehicle and wireless charging system.

Mobile inductive charging includes embedding charging pads (with inductive coils) in a road surface. The charging pads are connected to a power source and convert electrical energy from the power source into an electromagnetic field. The recipient coils on the electric vehicle driving over the charging pads convert the electromagnetic field to electrical energy that is used to charge the vehicle battery while the electric vehicle is driving on the road.

Mobile inductive charging presents challenges. For example, charging pads in mobile inductive charging systems may begin generating electromagnetic energy in response to a request from an electric vehicle. Otherwise, electricity may be wasted by keeping the charging pads running all the time. It takes time, however, for the electric vehicle and mobile inductive charging system to establish communication. Further, the electric vehicle would have to establish communication with every cluster of charging pads it comes across. Thus, in the case of mobility, extra support is needed to manage the exchange of information and handling the charging. Constantly establishing and reestablishing communication with different clusters of charging pads and the associated authorization and supporting infrastructure reduces the amount of time available for inductive charging and introduces an extra burden on the infrastructure.

One solution includes base stations of different wireless charging systems facilitating the handoff of the electric vehicle between wireless charging systems. An example of a wireless vehicle charging system includes a first cluster of charging pads wired to one another and configured to convert electrical energy to an electromagnetic field. The wireless vehicle charging system further includes a first base station in communication with the first cluster of charging pads and programmed to receive information from an electric vehicle and transmit the information to a second base station in communication with a second cluster of charging pads in a path of the electric vehicle.

In the wireless vehicle charging system, the information received from the electric vehicle and transmitted to the second base station may include at least one of vehicle identification information and charging session information.

In the wireless vehicle charging system, the first base station may be programmed to transmit information to the electric vehicle. Further, the information transmitted from the first base station to the electric vehicle may include charging capabilities of the first cluster. Under such circumstances, the information transmitted from the first base station to the electric vehicle may include charging capabilities of the second cluster.

In the wireless vehicle charging system, the first base station may be programmed to determine that the electric vehicle is receiving electrical energy from the first cluster of charging pads.

In the wireless vehicle charging system, the first base station may be programmed to determine that the electric vehicle is no longer receiving electrical energy from the first cluster of charging pads. In that instance, the first base station may be programmed to transmit the information to the second base station as a result of determining that the electric vehicle is no longer receiving electrical energy from the first cluster of charging pads. The first base station may also be programmed to transmit the information to the second base station before the electric vehicle arrives at the second cluster of charging pads.

In the wireless vehicle charging system, the first base station may be programmed to receive the path of the electric vehicle and select the second base station, from among a plurality of base stations, to receive the information from the electric vehicle based at least in part on the path of the electric vehicle.

In the wireless vehicle charging system, the first base station may be programmed to upload information about the charging of the electric vehicle to a remote server.

In the wireless vehicle charging system, the first base station may be programmed to transmit information to the second base station.

In the wireless vehicle charging system, the first base station may be in wired communication with the first cluster of charging pads and in wireless communication with the electric vehicle.

An example method includes receiving, at a first base station, information from an electric vehicle relating to inductively charging a propulsion battery of the electric vehicle via a first cluster of charging pads. The method further includes wirelessly transmitting the information from the first base station to a second base station in communication with a second cluster of charging pads in a path of the electric vehicle.

In the method, the information received from the electric vehicle and transmitted to the second base station may include at least one of vehicle identification information and charging session information.

The method may further include transmitting information from the first base station to the electric vehicle. In that instance, the information transmitted from the first base station to the electric vehicle may include charging capabilities of the first cluster and charging capabilities of the second cluster.

The method may further include determining that the electric vehicle is receiving electrical energy from the first cluster of charging pads.

The method may further include determining that the electric vehicle is no longer receiving electrical energy from the first cluster of charging pads and transmitting the information to the second base station as a result of determining that the electric vehicle is no longer receiving electrical energy from the first cluster of charging pads. In that instance, the information may be transmitted to the second base station before the electric vehicle arrives at the second cluster of charging pads.

The method may further include, receiving the path of the electric vehicle and selecting the second base station from among a plurality of base stations to receive the information from the electric vehicle based at least in part on the path of the electric vehicle.

The method may further include wirelessly uploading information about the charging of the electric vehicle from the first base station to a remote server.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1B:
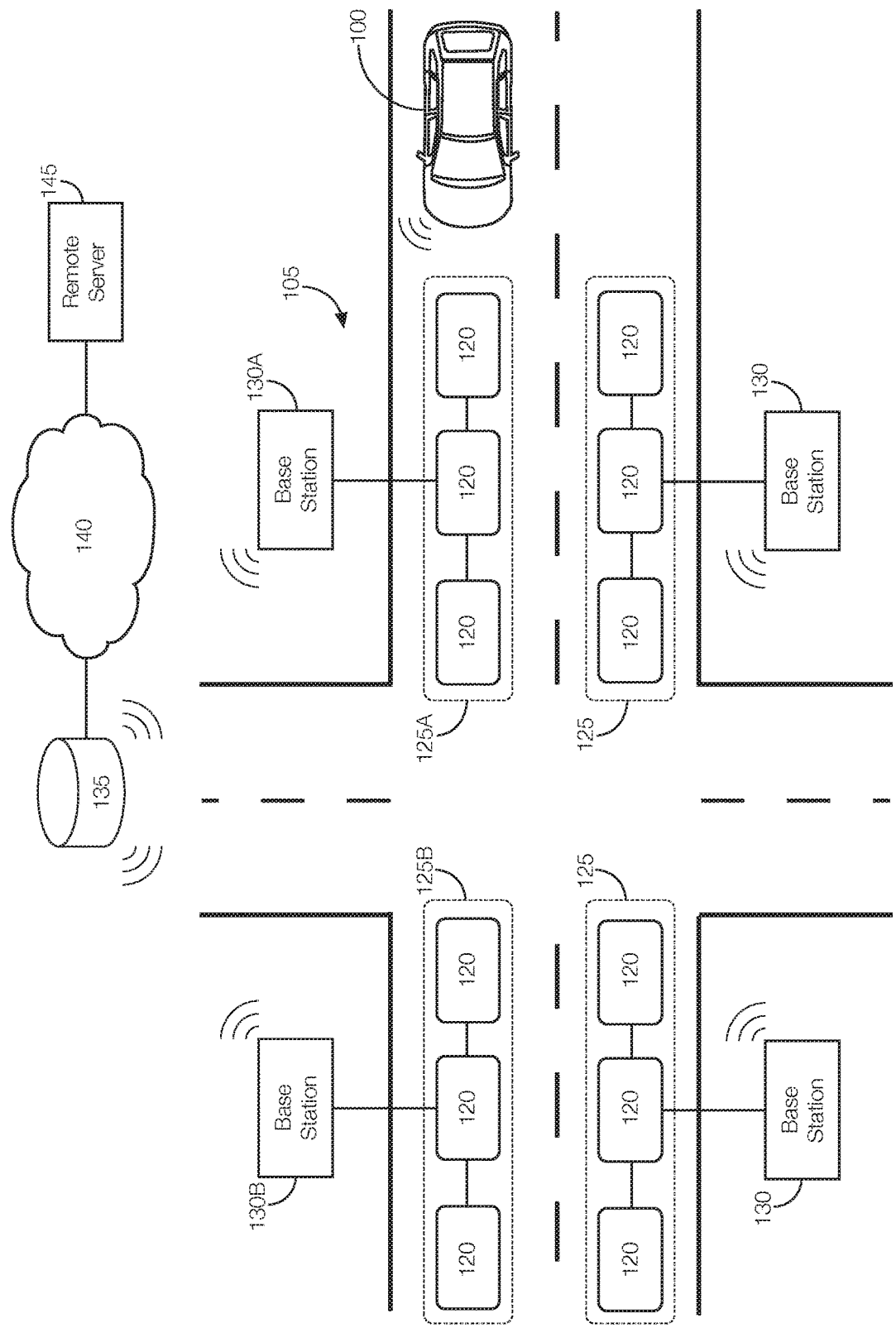

As illustrated in FIGS. 1A and 1B, an electric vehicle 100 receives wireless (i.e., inductive) charging via a wireless charging system 105 incorporated into a roadway. Although illustrated as a sedan, the electric vehicle 100 may be any passenger or commercial automobile such as a car, a truck, a sport utility vehicle, a crossover vehicle, a van, a minivan, a taxi, a bus, etc., with an electric propulsion motor 110 powered by a propulsion battery 115 that can be inductively charged.

The wireless charging system 105 includes charging pads 120, with primary coils, embedded in the roadway. As the electric vehicle 100 drives on the roadway, and over the charging pads 120, electrical energy from the charging pads 120 is inductively provided to the electric vehicle 100, charging a battery of the electric vehicle 100. That is, the primary coils of the charging pads 120 convert electrical current into an electromagnetic field. The electric vehicle 100 may include one or more coils (e.g., secondary coils) that convert electromagnetic field output by the primary coils of the charging pads 120 into electrical current that is provided to the propulsion battery 115, thereby charging the propulsion battery 115.

The electric vehicle 100 exchanges certain information with the wireless charging system 105 either prior to or during the wireless charging process (i.e., the process by which the electromagnetic field generated by the wireless charging system 105 charges the battery of the electric vehicle 100). The electric vehicle 100 may wirelessly transmit information such as vehicle identification information, subscription information (e.g., information representing the access the electric vehicle 100 has to one or more wireless charging systems 105), charging session identification information (e.g., information representing a particular charging session to distinguish from other charging sessions), accounting information (e.g., billing and account information associated with the owner of the electric vehicle 100), service selection information (e.g., information representing the charging services available to the electric vehicle 100), charging parameters (e.g., the technical details of the propulsion battery 115 and how it is to be charged), etc., to the wireless charging system 105. The electric vehicle 100 may further transmit other information such as its intended path, direction, speed if known.

The wireless charging system 105 may be separated into clusters 125. A first cluster 125A may include one group of primary coils while a second cluster 125B may include another group of primary coils. The primary coils in a single cluster 125 may be electrically connected to one another and to a base station 130 (sometimes called an "access point"). Each base station 130 is implemented via antennas, circuits, chips, or other electronic components programmed to communicate via various wired and wireless communication protocols, as discussed in greater detail below. The base stations 130 of different clusters 125 may be in wireless communication with one another. That is, a first base station 130A, in wired communication with the first cluster 125A, may wirelessly communicate with a second base station 130B, in wired communication with the second cluster 125B. The second base station 130B may be referred to as a "neighboring base station," along with any number of other base stations 130 within communication range of the first base station 130A. Further, each base station 130 may support any number of clusters 125. That is, a single base station 130 may support multiple clusters 125, or each base station 130 may support a single cluster 125. For purposes of simplicity, FIG. 1B illustrates one base station 130 per cluster 125.

The base stations 130 may be further programmed to wirelessly communicate over a telecommunications network 140. That is, the base stations 130 may be programmed to communicate with a gateway 135, implemented via circuits, chips, or other electronic components, that permits access to a network 140, such as a packet-switched network. In some instances, the gateway 135 may facilitate access to a satellite telecommunication network, a cellular telecommunication network, or the like. The base stations 130 may be programmed to communicate with one another and with the gateway 135 using any number of wired or wireless telecommunications protocols, such as WiFi IEEE802.11, cellular telecommunications protocols. etc. The base stations 130 may be programmed to send messages to, and receive messages from, remote servers 145 (e.g., a remote computing device programmed to communicate with the base stations 130, including receiving messages from and transmitting messages to the base stations 130) via the network 140. For instance, the base stations 130 may transmit data associated with the usage of the wireless charging system 105 to the remote server 145, which may process the data as described in greater detail below. The usage may indicate, e.g., that the electric vehicle 100 has used the wireless charging system 105, the amount of energy provided to the electric vehicle 100, etc. The remote server 145 may also be programmed to determine whether the vehicle 100 is authorized to use the wireless charging system 105. The remote server 145 may determine whether the vehicle 100 is authorized based on, e.g., accounting information or other information permitting access to the wireless charging system 105 such as information to authenticate the user, the vehicle 100, or both, to the base station 130, remote server 145, or both.

The base stations 130 may also wirelessly communicate with the electric vehicle 100. Thus, the electric vehicle 100 may communicate some information to the nearest base station 130 (e.g., the base station 130 in wired communication with the cluster 125 presently providing the electromagnetic field to the electric vehicle 100), and the base station 130 that received that information may transmit it to other neighboring base stations 130 or base stations 130 along the path of the electric vehicle 100. That way, some information will be transmitted to base stations 130 ahead of the electric vehicle 100, but along the path of the electric vehicle 100, so future base stations 130 can command future charging pads 120 to begin providing the electromagnetic field immediately upon arrival of the electric vehicle 100, without having to perform a handshake operation first, which can take time away from charging.

For example, the electric vehicle 100 may transmit some information to the first base station 130A it encounters during a charging session. That is, the electric vehicle 100 may transmit its identification information, session information, and accounting information to the first base station 130A upon arrival at the first cluster 125A of charging pads 120. The first base station 130A may transmit the identification information, session information, and accounting information to the second base station 130B along the path of the electric vehicle 100. That way, the electric vehicle 100 does not necessarily need to provide all that information upon arrival at the second cluster 125B.

The electric vehicle 100 may also wirelessly receive information from certain base stations 130. For instance, the electric vehicle 100 may receive, from one or more of the base stations 130, information representing the charging capabilities of the associated cluster 125, information about neighboring base stations 130, or the like.

The communication between the electric vehicle 100 and the base stations 130 may be through any or a combination of wireless telecommunication protocol including, e.g., Wifi (e.g., IEEE802.11ai, IEEE802.11r, IEEE802.11k, etc.). Other possible wireless communication protocols that could be used by the electric vehicle 100 to communicate with the base stations 130 may include the dedicated short range communication (DSRC) protocol or another vehicle-to-infrastructure protocol, satellite telecommunications protocols, cellular telecommunications protocols, etc.

In some instances, the electric vehicle 100 may communicate to the base stations 130 through the charging pads 120. That is, the electric vehicle 100 may transmit signals to the charging pads 120, and those signals may be modulated long the wired connections between the charging pads 120 and from the charging pads 120 to the base station 130. In other words, certain signals from the electric vehicle 100 may be received at the base station 130 by way of the charging pads 120 instead of by way of direct wireless communication with the electric vehicle 100. The base station 130 can then transmit the information, received via the wired communication with the charging pads 120 of the cluster 125, to other base stations 130, such as other base stations 130 along the path of the electric vehicle 100. With this approach, regular handoffs between base stations 130 are not necessary.

Various Wifi (e.g., IEEE802.11) protocols are mentioned above. Multiple implementations of the Wifi protocol may be involved in the foregoing approach. For example, IEEE802.11ai may be used to associate base stations 130 (e.g., access points) along the path of the electric vehicle 100. Other implementations, such as a combination of IEEE802.11r and IEEE802.11k, may be used to support roaming since IEEE802.11r was not initially designed for vehicular speed mobility and IEEE802.11ai may provide a faster initial setup to manage higher speed connectivity.

As previously discussed, identification information, session information, and accounting information may be communicated at every cluster 125. Further, that information may be correlated at a higher level via, e.g., communication with various remote servers 145 available via the communication network 140 by way of the gateway 135. Further, service selection request parameters (which may include the charging capabilities of the cluster 125) may be transmitted to the electric vehicle 100 before the electric vehicle 100 begins a session and connects to the base station 130 associated with that cluster 125. Thus, the electric vehicle 100 can avoid wasting time establishing communication with a cluster 125 that is unable to help charge the propulsion battery 115.

The service selection request parameters, which may include EV charging information as well as other information, may be provided to the electric vehicle 100 as part of a beacon/probe response between the electric vehicle 100 and the base station 130. The service selection request parameters may also be exchanged in accordance with, e.g., access network query protocol (ANQP) request/response messages in accordance with IEEE82.11u. Service selection information may be grouped into classes based on different values. The class may be communicated rather than individually communicating all the parameters. The parameters may include power class of the electric vehicle 100, maximum receivable power, maximum secondary device (e.g., secondary coil) ground clearance, minimum secondary device (e.g., secondary coil) ground clearance, maximum operating frequency, minimum operating frequency, geometry of the secondary device, and circuit topology. Other information such as vehicle location, position relative to other vehicles, direction of travel, speed, and destination may also be included, as well as charging session and communication session parameters.

Upon initial link setup, the wireless charging subscription information and vehicle identification are communicated from the electric vehicle 100 to the base station 130. Parameters included in this exchange of information may include wireless charging subscription identification information, vehicle identification information, etc. That same information may be used during reassociation and reauthorization requests.

Other information exchanged may include charging parameters, charging classes, and charging subscription information. That information is generally static. While it may change occasionally, that information is not likely to change as the electric vehicle 100 travels between clusters 125. It may be received by the first base station 130A during initial setup and then transmitted from the first base station 130A to the second base station 130B, which is the next base station 130 along the path of the electric vehicle 100 using, e.g., IEEE802.11k & IEEE802.11r extended to share information about neighboring base stations 130 that support vehicle charging.

Handover information for various Wifi protocols, such as IEEE802.11r and IEEE802.11k, may be extended to include wireless transmission of session identification information, service selection class, accounting information, charging subscription information, etc. At least some of this and possibly other information may be exchanged at every cluster 125 or with every handover and reassociation. It also permits accounting information to be updated accordingly.

Figure 2:
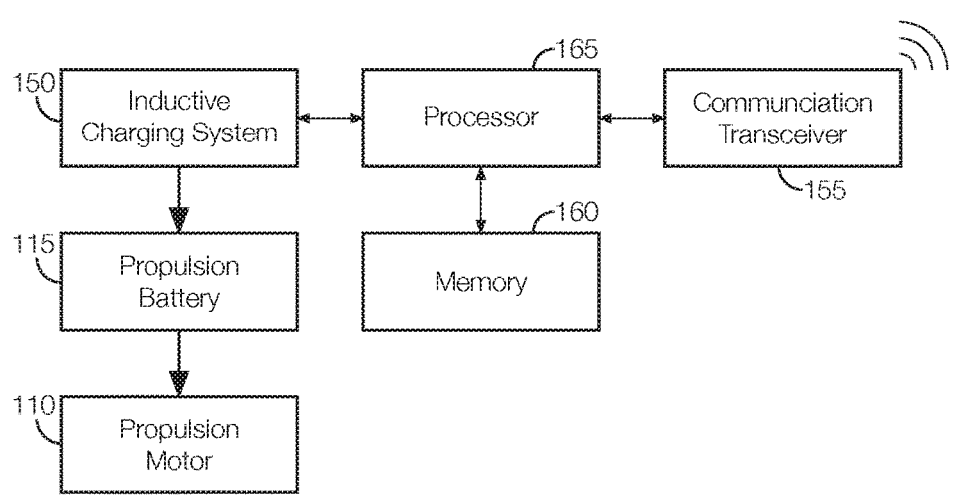
FIG. 2 is a block diagram illustrating example components of the electric vehicle.

Referring now to FIG. 2, components of the electric vehicle 100 may include the propulsion motor 110, the propulsion battery 115, an inductive charging system 150, a communication transceiver 155, a memory 160, and a processor 165.

The propulsion motor 110 is an electric motor powered by the propulsion battery 115. The propulsion motor 110 has a shaft that rotates at controllable speeds, and the rotation of the shaft may be applied to the wheels of the electric vehicle 100. Thus, the rotation of the shaft of the electric motor may be proportional to the speed of the electric vehicle 100. In some instances, a gearbox is located between the shaft of the propulsion motor 110 and the wheels.

The propulsion battery 115 is a battery that outputs sufficient charge to power the propulsion motor 110. Thus, the electrical energy output by the propulsion battery 115 causes the propulsion motor 110 to rotate. The propulsion battery 115 may be charged by the inductive charging system 150. In other words, the electrical energy output by the inductive charging system 150 may be stored in the propulsion battery 115.

The inductive charging system 150 includes secondary coils that receive electromagnetic fields output by the primary coils of the charging pads 120 embedded in the road. The inductive charging system 150 includes electrical circuits that convert the electromagnetic field into electrical current. The inductive charging system 150 outputs the electrical current to the propulsion battery 115, which stores the electrical current output by the inductive charging system 150.

The communication transceiver 155 is implemented via an antenna, circuits, chips, or other electronic components that facilitate wireless communication between the electric vehicle 100 and the charging pads 120, the base stations 130, or both. The communication transceiver 155 may be programmed to communicate in accordance with any number of wired or wireless communication protocols. For instance, the communication transceiver 155 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc. In some instances, the communication transceiver 155 is incorporated into a vehicle telematics unit. In general, the transceiver 155 may be programmed to support two modes of operation; sensing and communication. Sensing includes discovering a wireless charging pad within proximity using, e.g., a short range low power communication process. The communication mode of operation may involve consistent connectivity, supporting handover, and the ability to transmit more data.

The memory 160 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 160 may store instructions executable by the processor 165 and data such as vehicle identification information, subscription information, charging session identification information, accounting information, service selection information, charging parameters, etc. The data stored in the memory 160 may include data to be transmitted from the electric vehicle 100 to the base station 130, data received at the electric vehicle 100 from the base station 130, or a combination of both. The instructions and data stored in the memory 160 may be accessible to the processor 165 and possibly other components of the electric vehicle 100.

The processor 165 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 165 is programmed to facilitate the communication between the electric vehicle 100 and the wireless charging system 105. That is, the processor 165 is programmed to detect when the electric vehicle 100 has arrived at the first cluster 125A, command the communication transceiver 155 to send data to the base station 130 either directly or by modulating signals along the wires connecting the charging pads 120 to the base station 130, and process signals received at the electric vehicle 100 via, e.g., the communication transceiver 155.

Figure 3:
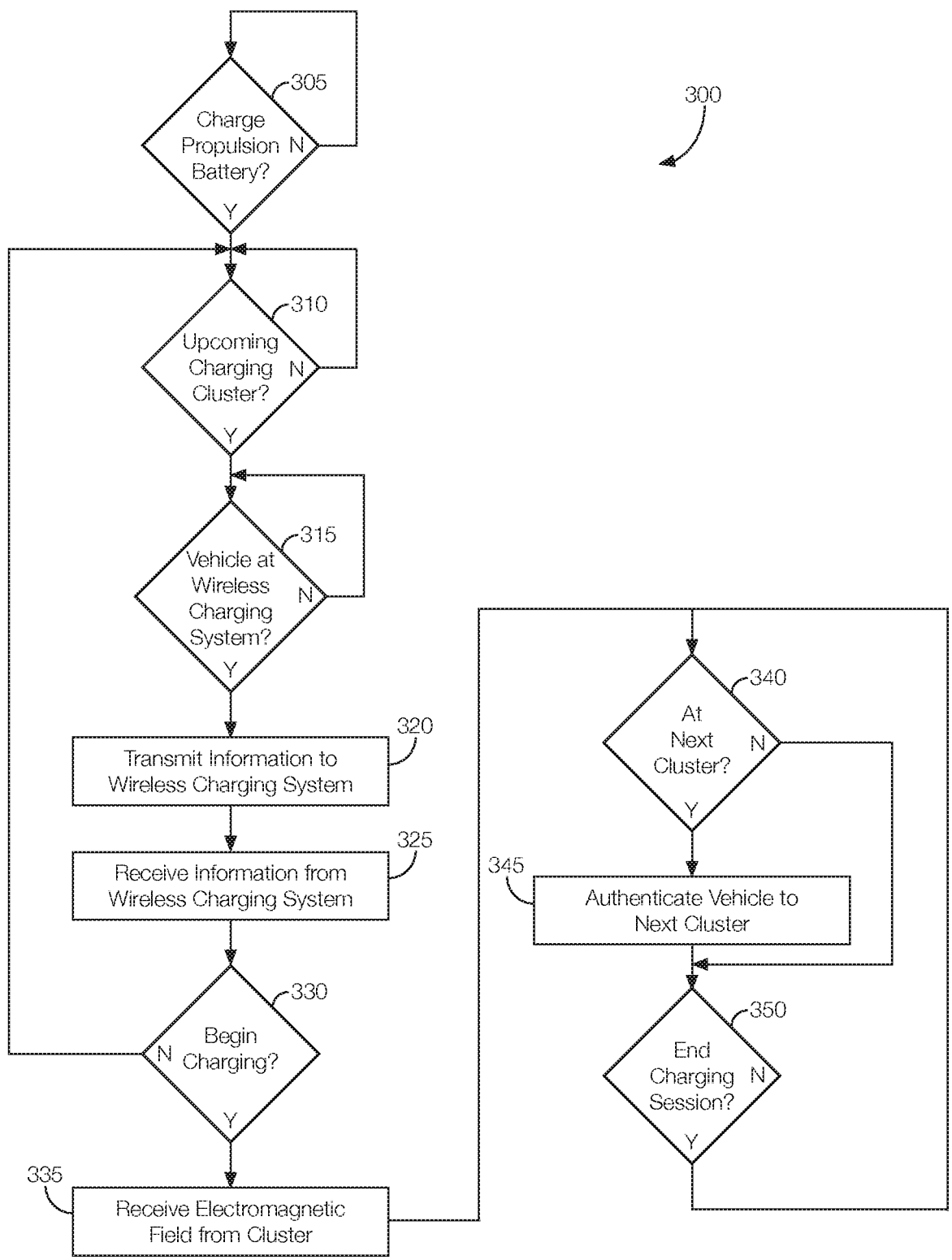
FIG. 3 is a flowchart of an example process that may be executed by the vehicle.

FIG. 3 is a flowchart of an example process 300 that may be executed by the electric vehicle 100. The process 300 may begin any time the electric vehicle 100 is operating in an electric (EV) mode or a non-electric mode (in the case where the electric vehicle 100 is a hybrid-electric vehicle 100) and is approaching the wireless charging system 105.

At decision block 305, the electric vehicle 100 determines whether the propulsion battery 115 needs to be charged. The processor 165 may be programmed to determine that the propulsion battery 115 needs to be charged by comparing a state of charge of the propulsion battery 115 to a predetermined threshold. When the state of charge drops below the predetermined threshold, the processor 165 may be programmed to set a flag indicating that the propulsion battery 115 needs to be charged. When the propulsion battery 115 needs to be charged, the process 300 may proceed to block 310. Otherwise, the process 300 may repeat block 305 until the propulsion battery 115 needs to be charged.

At decision block 310, the electric vehicle 100 looks for upcoming wireless charging systems 105 and determines whether the electric vehicle 100 is approaching an upcoming cluster 125. The processor 165 may be programmed to detect that the electric vehicle 100 is approaching the first cluster 125A based on signals output by, e.g., a vehicle navigation system, on-board sensors (e.g., a lidar sensor, camera, radar sensor, etc.), or the like. If the processor 165 determines that the electric vehicle 100 is approaching an upcoming cluster 125, the process 300 continues to block 315. Otherwise, block 310 is repeated until an upcoming cluster 125 is detected, the electric vehicle 100 is shut down, or a charge is no longer needed.

At decision block 315, the electric vehicle 100 determines whether it has arrived at the wireless charging system 105. The processor 165 may be programmed to determine that the electric vehicle 100 has arrived at the wireless charging system 105 based on, e.g., signals output by the vehicle navigation system, on-board sensors (e.g., the lidar sensor, camera, radar sensor, etc.), or the like. If the processor 165 determines that the electric vehicle 100 has arrived at the wireless charging system 105, the process 300 continues to block 320. Otherwise, block 315 is repeated until the processor 165 determines that the electric vehicle 100 has arrived at the charging cluster 125, the electric vehicle 100 is shut down, or a charge is no longer needed.

At block 320, the electric vehicle 100 transmits information to the wireless charging system 105. For instance, the processor 165 may be programmed to command the communication transceiver 155 to transmit data, stored in the memory 160, to the wireless charging system 105. The data may include vehicle identification information, subscription information, charging session identification information, accounting information, service selection information, charging parameters, etc. The information may also include the intended path of the electric vehicle 100. The processor 165 may command the communication transceiver 155 to transmit the information wirelessly either directly to the first base station 130A or by modulating signals along the wires connecting the charging pads 120 of the first charge cluster 125A to the first base station 130A.

At block 325, the electric vehicle 100 receives information from the wireless charging system 105. The information may be received wirelessly via the communication transceiver 155 and provided to the processor 165 for processing. The information transmitted from the base station 130 may include the charging capabilities of the first cluster 125A, information about the charging capabilities of nearby base stations 130 and nearby clusters 125 along the path of the electric vehicle 100 or otherwise within range of the electric vehicle 100, etc.

At block 330, the electric vehicle 100 determines whether to begin charging the propulsion battery. The processor 165 may compare the information received at block 325 to the technical requirements of the propulsion battery and the inductive charging system 150 of the electric vehicle 100 to ensure that the electromagnetic field output by the first cluster 125A can be used to charge the propulsion battery. If the first charge cluster 125A is compatible with the inductive charging system 150 of the electric vehicle 100, the process 300 may proceed to block 335. Otherwise, the process 300 may return to block 310 so a new wireless charging system 105 may be sought out.

At block 335, the electric vehicle 100 receives the electromagnetic field output by the primary coils of the charging pads 120 of the first charge cluster 125A. That is, the processor 165 may be programmed to activate the inductive charging system 150 so it converts the electromagnetic field output by the primary coils into electrical energy that can be stored in the propulsion battery. The processor 165 may be programmed to activate the inductive charging system 150 by outputting a control signal commanding the inductive charging system 150 to activate and begin charging the propulsion battery.

At decision block 340, the electric vehicle 100 determines whether it has arrived at the next charge cluster 125. The processor 165 may determine that the electric vehicle 100 has left one charge cluster 125 (e.g., the first charge cluster 125A) and arrived at the next charge cluster 125 (e.g., the second charge cluster 125B) based on signals output by the induction charging system, based on how the state of charge of the propulsion battery changes over time, based on location information, based on communications with one or more base stations 130 such as the first base station 130A, the second base station 130B, or both, or the like. If the processor 165 determines that the electric vehicle 100 is at the next charge cluster 125, the process 300 may proceed to block 345. Otherwise, the process 300 may proceed to block 350.

At block 345, the electric vehicle 100 authenticates itself to the next charge cluster 125. That is, the processor 165 may command the communication transceiver 155 to communicate certain information, such as the vehicle identification, the charging session, accounting information, etc., to the base station 130 to the next charge cluster 125. That way, the base station 130 of the next charge cluster 125 can compare the information received to that transmitted from the base station 130 of the previous charge cluster 125 servicing the electric vehicle 100 without requiring the electric vehicle 100 to undergo a formal handshake procedure with every charge cluster 125 it encounters and also allowing the electric vehicle 100 to maintain a single charging session despite traveling over different charge clusters 125. The process 300 may proceed to block 350.

At decision block 350, the electric vehicle 100 determines whether to end the charging session (e.g., stop charging the propulsion battery). The processor 165 may be programmed to decide whether to end the charging session by comparing the present state of charge to a threshold value associated with a full battery. If the present state of charge meets or exceeds the predetermined value, the processor 165 may determine that the propulsion battery is sufficiently charged and deactivate the inductive charging system 150 by, e.g., outputting a command to the inductive charging system 150 to stop converting the electromagnetic field into electrical energy, to stop storing the electrical energy in the propulsion battery, or both. This will end the present charging session. The processor 165 may be programmed to keep the inductive charging system 150 activated (e.g., continue the charging session) even as the electric vehicle 100 travels from one charge cluster 125 to the next, especially in instances where charge clusters 125 are nearby one another along the path of the electric vehicle 100 and where the base stations 130 of the charge clusters 125 facilitate the handoff between charge clusters 125. However, the processor 165 may be programmed to end the charging session as a result of determining that the electric vehicle 100 has traveled a predetermined distance or amount of time without encountering a subsequent charge cluster 125. The process 300 may end (or return to block 305) after the processor 165 decides to stop charging session. Otherwise, the process 300 may repeat at blocks 340-350 until the charging session ends.

Figure 4:
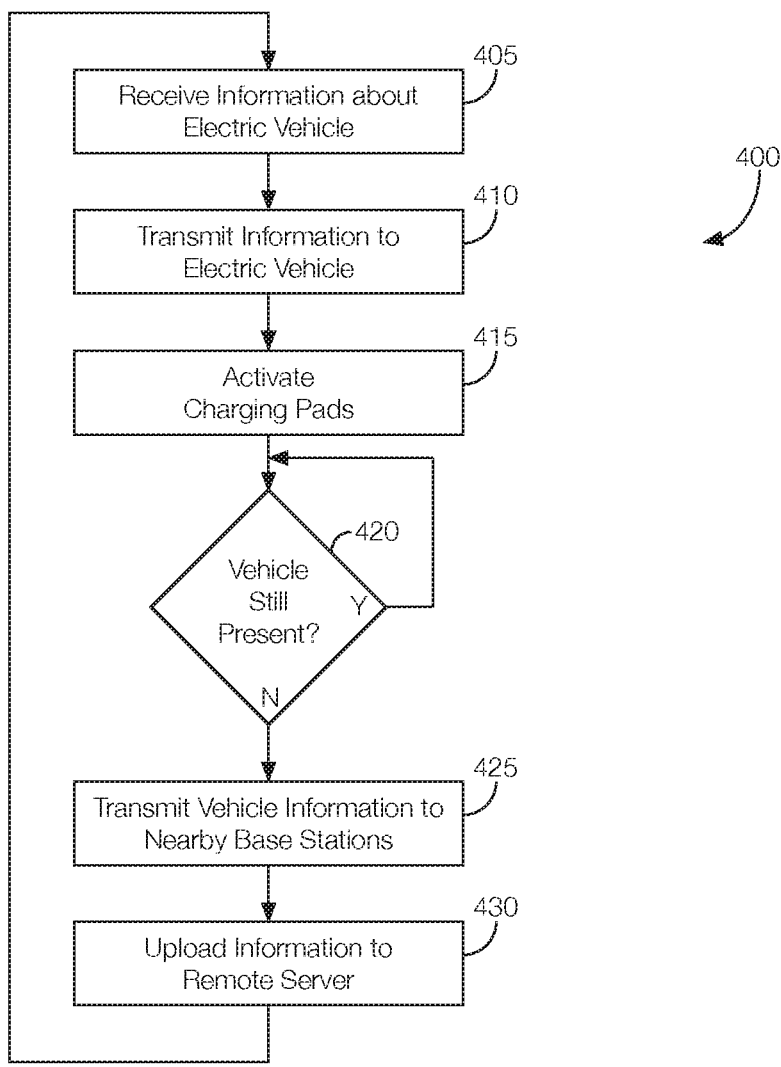
FIG. 4 is a flowchart of an example process that may be executed by the wireless charging system.

FIG. 4 is a flowchart of an example process 400 that may be executed by the wireless charging system 105. The process 400 may begin any time the wireless charging system 105 is activated and available to inductively charge vehicle batteries.

At block 405, the base station 130 receives information. The information may be received from the electric vehicle 100 or another base station 130. If the information came from the electric vehicle 100, the base station 130 may determine that it is the first base station 130 in a charging session for the electric vehicle 100. If the information came from another base station 130, it may determine that it is not the first base station 130 for the electric vehicle 100 in the charging session. In either instance, the base station 130 may receive the information either wirelessly or via signals modulated along the wires connecting the charging pads 120 to the base station 130. Further, as discussed above, the information received at block 405 may include vehicle identification information, subscription information, charging session identification information, accounting information, service selection information, charging parameters, etc.

At block 410, the base station 130 transmits information to the electric vehicle 100. The information transmitted to the electric vehicle 100 may include the charging capabilities of the cluster 125 associated with the base station 130, information about the charging capabilities of nearby base stations 130 and nearby clusters 125 along the path of the electric vehicle 100 or otherwise within range of the electric vehicle 100, etc. The base station 130 may transmit the information to the electric vehicle 100 wirelessly, either directly to the communication transceiver 155 of the electric vehicle 100 via Wifi, for instance, or by modulating signals along the wired connection between the base station 130 and the charging pads 120.

At block 415, the base station 130 commands the charging pads 120 to begin converting the electric current to the electromagnetic field that can charge the propulsion battery of the electric vehicle 100. In some instances, this may occur earlier in the process 400, such as before block 405, before block 410, etc.

At decision block 420, the base station 130 determines whether the electric vehicle 100 is still present at the charge cluster 125 associated with the base station 130. If so, the process 400 may continue to execute block 420 until the electric vehicle 100 is no longer at the charge cluster 125, at which point the process 400 may proceed to block 425.

At block 425, the base station 130 transmits the information to other nearby base stations 130. If the base station 130 knows the path of the electric vehicle 100, which may have been received with the information at block 405, the base station 130 may transmit the information to other base stations 130 along or near the path of the electric vehicle 100. That is, the first base station 130A may be programmed to select the second base station 130B, among a plurality of base stations 130, based on, e.g., the second base station 130B being the next base station 130 the electric vehicle 100 will encounter along its path. The base station 130 may wirelessly transmit the information to other base stations 130 using a wireless communication protocol such as, e.g., Wifi.

At block 430, the base station 130 uploads information about the charging of the propulsion battery to a remote server 145. That is, the base station 130 may transmit the information to the remote server 145 via the gateway 135 and communication network 140. The information transmitted to the remote server 145 may represent the amount of time the electric vehicle 100 spent at the charge cluster 125, how much electrical energy the electric vehicle 100 received from the charge cluster 125, etc. If each base station 130 uploads such information to the remote server 145, the remote server 145 can aggregate the data for, e.g., statistical analysis and billing purposes.

The process 400 may end after block 430 or may return to block 405 until the next electric vehicle 100 arrives. Before returning to block 405, however, the base station 130 may confirm that the next vehicle 100 is authorized to use the wireless charging system 105 by, as explained above, receiving and processing, e.g., accounting information or other information authenticating the user, the vehicle 100, or both.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A wireless vehicle charging system comprising:
    a first cluster of charging pads wired to one another and configured to convert electrical energy to an electromagnetic field;
    a first base station in communication with the first cluster of charging pads and programmed to receive information from an electric vehicle and transmit the information to a second base station in communication with a second cluster of charging pads in a path of the electric vehicle; and
    wherein the first base station is programmed to receive the path of the electric vehicle and select the second base station, from among a plurality of base stations, to receive the information from the electric vehicle based at least in part on the path of the electric vehicle.

2. The wireless vehicle charging system of claim 1, wherein the information received from the electric vehicle and transmitted to the second base station includes at least one of vehicle identification information and charging session information.

3. The wireless vehicle charging system of claim 1, wherein the first base station is programmed to transmit information to the electric vehicle, and wherein the information transmitted from the first base station to the electric vehicle includes charging capabilities of the first cluster.

4. The wireless vehicle charging system of claim 3, wherein the information transmitted from the first base station to the electric vehicle includes charging capabilities of the second cluster.

5. The wireless vehicle charging system of claim 1, wherein the first base station is programmed to determine that the electric vehicle is receiving electrical energy from the first cluster of charging pads.

6. The wireless vehicle charging system of claim 1, wherein the first base station is programmed to determine that the electric vehicle is no longer receiving electrical energy from the first cluster of charging pads.

7. The wireless vehicle charging system of claim 6, wherein the first base station is programmed to transmit the information to the second base station as a result of determining that the electric vehicle is no longer receiving electrical energy from the first cluster of charging pads.

8. The wireless vehicle charging system of claim 7, wherein the first base station is programmed to transmit the information to the second base station before the electric vehicle arrives at the second cluster of charging pads.

9. The wireless vehicle charging system of claim 1, wherein the first base station is programmed to upload information about the charging of the electric vehicle to a remote server.

10. The wireless vehicle charging system of claim 1, wherein the first base station is programmed to transmit information to the second base station.

11. The wireless vehicle charging system of claim 1, wherein the first base station is in wired communication with the first cluster of charging pads and in wireless communication with the electric vehicle.

12. A method comprising:
    receiving, at a first base station, information from an electric vehicle including a path of the electric vehicle and information relating to inductively charging a propulsion battery of the electric vehicle via a first cluster of charging pads;
    wirelessly transmitting the information from the first base station to a second base station in communication with a second cluster of charging pads in the path of the electric vehicle; and
    wherein the second base station is selected from among a plurality of base stations to receive the information from the electric vehicle based at least in part on the path of the electric vehicle.

13. The method of claim 12, wherein the information received from the electric vehicle and transmitted to the second base station includes at least one of vehicle identification information and charging session information.

14. The method of claim 12, further comprising transmitting information from the first base station to the electric vehicle, and wherein the information transmitted from the first base station to the electric vehicle includes charging capabilities of the first cluster and charging capabilities of the second cluster.

15. The method of claim 12, further comprising determining that the electric vehicle is receiving electrical energy from the first cluster of charging pads.

16. The method of claim 12, further comprising:
    determining that the electric vehicle is no longer receiving electrical energy from the first cluster of charging pads;
    transmitting the information to the second base station as a result of determining that the electric vehicle is no longer receiving electrical energy from the first cluster of charging pads; and
    wherein the information is transmitted to the second base station before the electric vehicle arrives at the second cluster of charging pads.

17. The method of claim 12, further comprising wirelessly uploading information about the charging of the electric vehicle from the first base station to a remote server.

* * * * *